United States Patent [19]
Rutter et al.

[11] Patent Number: 6,115,679
[45] Date of Patent: Sep. 5, 2000

[54] DATA-LOGGING APPARATUS FOR LIVESTOCK

[75] Inventors: Steven Mark Rutter; Peter Dale Penning, both of Okehampton, United Kingdom

[73] Assignee: Institute of Grassland and Environmental Research, Ceredigion, United Kingdom

[21] Appl. No.: 08/861,848

[22] Filed: May 22, 1997

[30] Foreign Application Priority Data

May 22, 1996 [GB] United Kingdom .................. 9610740

[51] Int. Cl.[7] ...................................... A01K 3/00
[52] U.S. Cl. ............................. 702/187; 119/421
[58] Field of Search ............... 702/187; 119/421, 119/908, 720, 721

[56] References Cited

U.S. PATENT DOCUMENTS

| | | | |
|---|---|---|---|
| 4,618,861 | 10/1986 | Gettens et al. | 340/825.54 |
| 5,379,224 | 1/1995 | Brown et al. | 364/449 |
| 5,791,294 | 8/1998 | Manning | 119/721 |

*Primary Examiner*—Timothy P. Callahan
*Assistant Examiner*—Linh Nguyen
*Attorney, Agent, or Firm*—Haynes and Boone, LLP; Tim Headley

[57] ABSTRACT

The data-logging apparatus for fitting to an animal comprises a sensor for sensing one or more conditions or activities of the animal, a processor for processing output signals from the sensor and to store data relating to one or more activities or conditions, and a timer to control the instant of time at which the processor commences and/or ceases to operate.

9 Claims, 1 Drawing Sheet

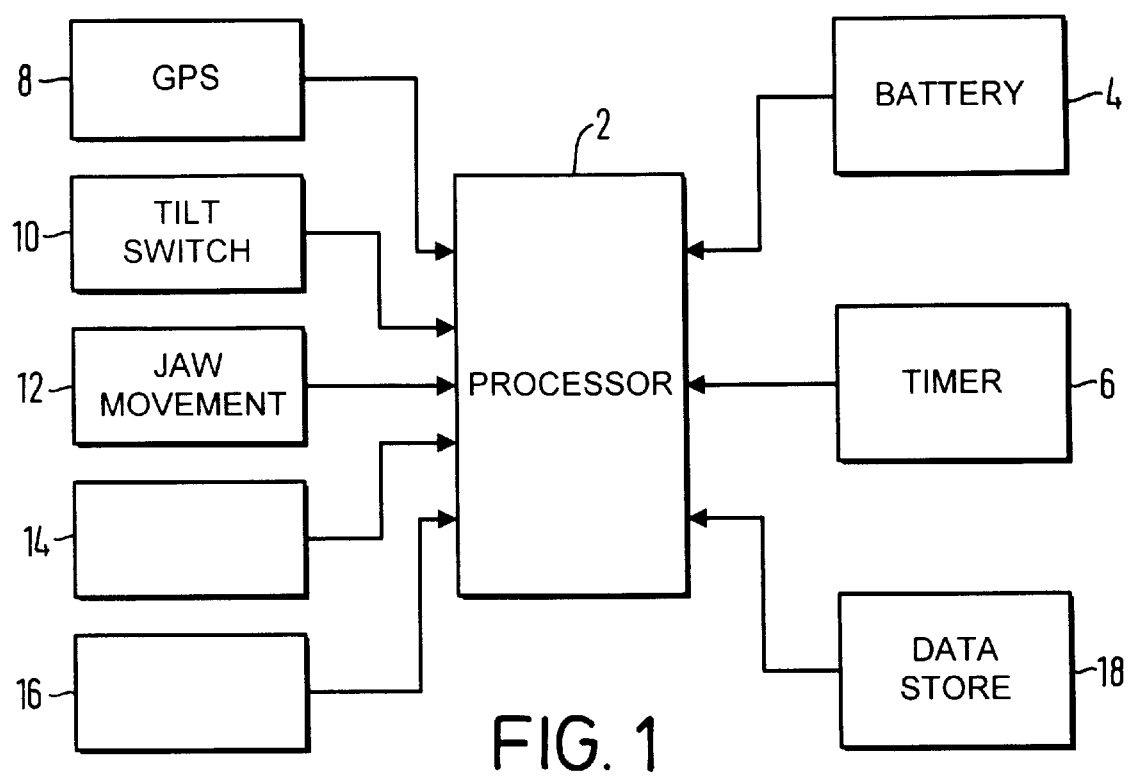
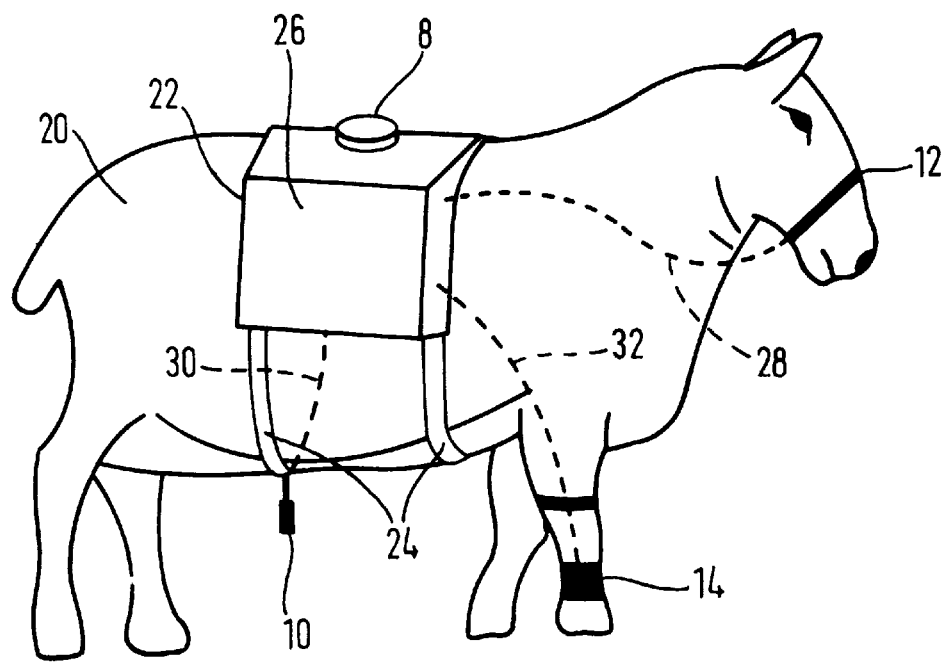

DATA-LOGGING APPARATUS FOR LIVESTOCK

BACKGROUND OF THE INVENTION

The present invention relates to data logging apparatus for fitting to an animal to monitor its behavior, and particularly, but not exclusively the grazing behavior of sheep or other livestock.

Several data logging devices are known for attaching to livestock so that various sensed conditions relating to an animal's behavior may be processed and stored. Such data-logging devices are typically used to study the behavior of animals in order to develop more effective methods of livestock management or husbandry.

A significant limitation of such devices is that the data-logging cycle of each device must be initiated at the time of fitting the device to an animal. This restriction may be undesirable for one of two reasons.

Firstly, the instant of time available for fitting the device may not coincide with the period of interest for which data-logging is required. For instance, climatic or geographic considerations may restrict access to certain animal habitats at certain times.

Secondly, if a plurality of animals is to be simultaneously monitored, a common requirement is for the respective results to be compared and contrasted. If, for instance, a large number of devices are to be fitted or if certain of the animals are some distance apart, it may be extremely difficult to synchronize the various data acquisition cycles and therefore to accurately correlate the results obtained.

SUMMARY OF THE INVENTION

We have now devised data-logging apparatus which alleviates the above mentioned limitations of previously proposed data logging devices.

In accordance wit he present invention, there is provided data-logging apparatus for fitting to an animal, said apparatus comprising sensing means for sensing one or more conditions or activities of the animal, processing means arranged to process output signals from said sensing means and to store data relating to said one or more activities or conditions, and timing means to control the instant of time at which said processing means commences and/or ceases to operate.

The timing means is preferably arranged to regulate periodic or intermittent data acquisition cycles of the data-logging apparatus.

The sensing means is preferably arranged to sense one or more of the following parameters:

whether the jaws of the animal are moved, and/or how often the jaws are moved, and/or the type of jaw movement;

the geographical location of the animal;

whether the animal is standing upright or lying down (for example, using a tilt switch or the like suspended from the animal's body); and whether the animal is moving (for example, using a tilt switch or the like which is secured to one of the animal's legs).

In use, a group such as a herd or flock of livestock may each be fitted with one such data-logging apparatus, each apparatus being programmed to commence data-logging at the same predetermined instant so that the stored data, obtained by the sensor of the respective apparatus, may be accurately correlated at some later time.

DESCRIPTION OF THE DRAWINGS

FIG. 1 is a schematic block diagram of the electronic system of a data-logging apparatus in accordance with the present invention; and FIG. 2 is an illustration of a sheep fitted with the data-logging apparatus of FIG. 1.

DETAILED DESCRIPTION OF THE PREFERRED EMBODIMENT

Referring to FIG. 1 of the drawings, there is shown schematically the electronic system of a data-logging apparatus for fitting to an animal to record its behavior. The apparatus comprises a microprocessor 2 supplied with power from a rechargeable battery pack 4 and arranged to operate, according to single from a clock or timer circuit 6, to process signals received from a plurality of sensors 8, 10, 12, 14, 16 and to output the resulting data to an electronic data store 18.

Of the plurality of sensors, a satellite positioning sensor 8 monitors the geographical location of the animal, a sensor 10 (in the form of a tilt switch) provides a signal depending on whether or not the animal is standing or lying down, a jaw movement sensor 12 provides a signal according to either the grazing or mastication action of the animal's jaw, and a movement sensor 14 (typically a further tilt switch, to be attached to the animal's leg) provides a signal depending on whether or not the animal is in ambulatory motion. Other sensors such as sensor 16 may be provided for other purposes, such as, for example, to indicate whether or not the animal's head is lowered, etc.

The inputs from the various sensors are first digitised and then processed by the processor 2 to provide data which is stored in the data store 18, which may comprise electronic or magnetic storage media such as RAM (random access memory) on disc or the like or magnetic tape. Alternatively the data may be relayed, for example by radio signals, to a remote data store. In either case, the stored data may be retrieved from the data store 18 later to be analyzed in greater detail.

The clock or timer circuitry 6 enables the whole or part of the data-logging apparatus to be switched on or off, or to go into a low-power consumption standby mode, according to a program executed by the processor 2 and/or by the clock or timer circuit 6. Whereas conventional data-logging devices commence a data-logging cycle immediately the device is switched on, the apparatus according to the present invention is arranged so that a finite, predetermined period of time may elapse before the data-logging cycle is initiated. Therefore, for convenience, the timer circuit 6 may operate according to a 'calendar' type date/time value as opposed to an elapsed time measure, with the device being initialized to the current data/time at the time of fitting.

FIG. 2 shows a sheep 20 fitted with the data-logging apparatus of FIG. 1 by means of a pannier arrangement 22. The satellite positioning sensor 8 and the tilt switch 10 are attached to the top and to the underside strap parts 24 of the pannier respectively. A further tilt switch 14 is attached to a leg of the animal. First and second pannier compartments, containing an electronic data processor and rechargeable battery-pack respectively, are situated either side of the sheep: one such compartment is shown at 26. The movement sensor 12 extends around the animal's jaw parts and communicates an electronic signal to the processor via a flexible conductive connection 28. Tilt switches 10 and 14 are also connected to the processor via respective conductive connections 30 and 32.

While the data-logging apparatus has been described for use in monitoring the behavior of livestock, it may instead be used to monitor any domesticated or wild animal in its natural habitat, in captivity, or under laboratory conditions.

We claim:

1. A data-logging apparatus for fitting to an animal, said apparatus comprising:
   (a) sensing means for sensing one or more conditions or activities of the animal;
   (b) processing means arranged to process output signals from aid sensing means and to store data relating to said one or more activities or conditions; and
   (c) timing means to control a time parameter selected from the group consisting of the instant of time at which said processing means commences and the instant of time at which said processing means ceases to operate.

2. Apparatus according to claim 1, wherein said timing means is arranged to regulate periodic or intermittent data acquisition cycles of the data-logging apparatus.

3. Apparatus according to claim 1, wherein said animal has jaws and said sensing means is arranged to sense a movement parameter selected from (a) whether said jaws are moved; (b) how often said jaws are moved; and (c) an indication of type of movement of said jaws.

4. Apparatus acccording to claim 1, wherein said sensing means is arranged to sense a geographical location of the animal.

5. Apparatus according to claim 1, wherein said sensing means is arranged to sense whether the animal is standing upright or lying down.

6. Apparatus according to claim 5, which includes means for suspending a tilt switch from the animal.

7. Apparatus according to claim 1, wherein said sensing means is arranged to sense whether the animal is moving.

8. Apparatus according to claim 7, wherein said animal has legs and said apparatus includes means for securing a tilt switch to one of the animal's legs.

9. A method of monitoring a herd or flock of livestock, which comprises:
   (a) providing sufficient data logging apparatus according to claim 1 for each member of said herd or flock;
   (b) programming each said apparatus such that each apparatus can commence data-logging at the same predetermined instant so that stored data, obtained by the sensor of the respective apparatus, may be accurately correlated at some later time; and
   (c) fitting each member of said herd or flock with a respective one of said programmed apparatus.

* * * * *